(12) United States Patent
Glugla et al.

(10) Patent No.: US 10,626,840 B2
(45) Date of Patent: Apr. 21, 2020

(54) METHODS AND SYSTEMS FOR SPARK TIMING CONTROL

(71) Applicant: Ford Global Technologies, LLC, Dearborn, MI (US)

(72) Inventors: Christopher Paul Glugla, Macomb, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 15/637,999

(22) Filed: Jun. 29, 2017

(65) Prior Publication Data

US 2019/0003445 A1    Jan. 3, 2019

(51) Int. Cl.
*F02P 5/15*    (2006.01)

(52) U.S. Cl.
CPC .................. *F02P 5/1504* (2013.01)

(58) Field of Classification Search
CPC .................................................. F02P 5/1504
USPC .................................................. 123/406.25
See application file for complete search history.

(56) References Cited

U.S. PATENT DOCUMENTS

| | | | |
|---|---|---|---|
| 4,389,992 A | 6/1983 | Shigematsu et al. | |
| 4,422,422 A * | 12/1983 | Mowery | F02P 5/1521 123/406.36 |
| 4,428,343 A * | 1/1984 | Schweikert | F02P 5/1521 123/406.36 |
| 5,445,127 A * | 8/1995 | Cullen | F02P 5/1521 123/406.51 |
| 5,735,245 A * | 4/1998 | Kubesh | F02D 37/02 123/406.55 |
| 5,740,045 A * | 4/1998 | Livshiz | F02P 5/1504 123/339.19 |
| 6,062,204 A * | 5/2000 | Cullen | F02D 41/005 123/406.12 |
| 6,244,243 B1* | 6/2001 | Mamiya | F02D 37/02 123/295 |
| 6,915,783 B2* | 7/2005 | Mader | F02D 11/105 123/192.1 |
| 6,997,167 B2* | 2/2006 | Kitagawa | F02D 41/045 123/480 |
| 7,597,093 B2* | 10/2009 | Totten | F02D 41/005 123/406.26 |
| 8,996,266 B2* | 3/2015 | Hultengren | F16D 13/00 477/166 |
| 2002/0019291 A1* | 2/2002 | Ito | B60W 10/06 477/92 |
| 2004/0112336 A1* | 6/2004 | Badillo | F02D 41/045 123/406.51 |
| 2007/0213909 A1* | 9/2007 | Doering | F02D 41/0002 701/54 |

(Continued)

*Primary Examiner* — David Hamaoui
*Assistant Examiner* — John D Bailey
(74) *Attorney, Agent, or Firm* — Geoffrey Brumbaugh; McCoy Russell LLP

(57) ABSTRACT

Methods and systems are provided for adjust spark timing based on ambient humidity and transient tip-in parameters. In one example, a method may include, during a tip-in, retarding spark timing based on each of ambient humidity, peak air charge, and rate of change of air charge. As such, the spark timing retard may be higher at lower humidity levels, and the spark timing retard may be lower at higher humidity levels.

17 Claims, 5 Drawing Sheets

(56) References Cited

U.S. PATENT DOCUMENTS

| | | | |
|---|---|---|---|
| 2009/0275440 A1* | 11/2009 | Doering | F02D 41/0002 477/102 |
| 2009/0283070 A1* | 11/2009 | Whitney | F02D 11/105 123/339.11 |
| 2013/0275030 A1* | 10/2013 | Kim | F02D 41/1461 701/108 |
| 2014/0076289 A1* | 3/2014 | Ruona | F02B 29/0425 123/542 |
| 2014/0109568 A1* | 4/2014 | Glugla | F02D 41/10 60/599 |
| 2014/0109870 A1* | 4/2014 | Glugla | F02B 29/0406 123/406.11 |
| 2014/0109871 A1* | 4/2014 | Glugla | F02B 29/0468 123/406.19 |
| 2014/0236392 A1* | 8/2014 | Nanba | F02D 41/24 701/2 |
| 2014/0352663 A1* | 12/2014 | Glugla | F02D 41/0085 123/443 |
| 2015/0047603 A1* | 2/2015 | Surnilla | F02D 41/0007 123/350 |
| 2015/0167624 A1* | 6/2015 | Martin | F02D 37/02 123/406.11 |
| 2016/0047323 A1* | 2/2016 | Suzuki | F02P 5/1502 60/285 |
| 2016/0090935 A1* | 3/2016 | Tanaka | F02D 41/26 701/104 |
| 2016/0123246 A1* | 5/2016 | Saito | F02P 5/15 123/444 |
| 2016/0177848 A1* | 6/2016 | Surnilla | F02D 41/0002 701/103 |
| 2016/0245190 A1* | 8/2016 | Makled | B60W 30/18072 |
| 2017/0101949 A1* | 4/2017 | Yokono | F02D 41/3005 |
| 2017/0356359 A1* | 12/2017 | Glugla | F02D 41/221 |
| 2018/0171864 A1* | 6/2018 | Hakeem | F02D 41/0007 |

* cited by examiner

METHODS AND SYSTEMS FOR SPARK TIMING CONTROL

FIELD

The present description relates generally to methods and systems for controlling a vehicle engine to adjust spark timing based on ambient humidity and transient tip-in parameters.

BACKGROUND/SUMMARY

Combustion in engine cylinders may be affected by ambient humidity. Spark ignited internal combustion engines may encounter undesired combustion events, such as knock, during low humidity conditions when the combustion rate may increase. During higher humidity conditions, if the engine does not account for diluent composition in the air fuel mixture, water in charge air may act as a diluent and the combustion rate may decrease causing a reduction in engine efficiency.

Various approaches are provided to compensate for ambient humidity in order to improve combustion stability and engine efficiency. In one example, as shown in US 20140109870, Glugla et al. teaches adjustments to spark timing based on ambient humidity and condensate level in a charge air cooler. During conditions when condensate is released from the charge air cooler, spark timing may be adjusted based on the resulting intake manifold humidity and the current ambient humidity. For example, spark timing may be advanced from a timing that is retarded from MBT to or towards MBT. By applying the spark advance, knock toleration and combustion stability may be improved during the condensate purging.

However, the inventors herein have recognized potential issues with such an approach. As one example, by adjusting spark timing solely based on intake humidity and ambient humidity levels, throttle response and combustion stability may be adversely affected during tip-in conditions. In particular, spark timing may not be sufficiently advanced. Therefore, even after adjusting spark timing based on humidity, knock may be encountered due to transient changes in air charge response during a tip-in. In addition, the time to torque response on the tip-in may be degraded due to a portion of charge air being replaced by humidity.

In one example, the issues described above may be addressed by a method for an engine comprising: adjusting spark timing applied at an operator tip-in event based on each of ambient humidity and transient air charge parameters of the tip-in event. In this way, by continually adjusting spark timing based on each of ambient humidity and air charge parameters, combustion stability and throttle response may be improved.

In one example, an ambient humidity may be estimated based on inputs from one or more engine sensors, such as a humidity sensor. During steady-state engine operation, spark timing may be adjusted relative to maximum brake torque (MBT) based on ambient humidity, spark timing retarded from MBT as ambient humidity decreases. During transient engine operation, particularly during a tip-in event when there is an increase in operator torque demand, spark timing may be adjusted based on the ambient humidity and further based on the transient air charge parameters (e.g., tip-in parameters). These may include, for example, a rate of change of air charge and a peak air charge of the tip-in. A three-dimensional map plotted a function of each of the ambient humidity, the rate of change of air charge, and the peak air charge may be used to determine the spark timing adjustment to apply during the tip-in condition. The spark timing adjustment to be applied at the tip-in may include each of an amount of spark timing retard from MBT, a duration of applying the spark timing retard (e.g., number of combustion events or engine cycles or which to apply the spark retard), and a rate of change of spark timing retard, as determined using the three-dimensional map or an alternate algorithm. As an example, spark timing may be retarded further from MBT as one or more of a rate of change of the air charge and a peak air charge of the tip-in increases. As another example, a higher amount of spark timing retard may be applied at lower humidity levels. During a subsequent tip-out, the spark timing adjustment may be performed based only on the humidity.

The inventors have recognized that spark timing adjustments that are based on humidity and tip-in air charge parameters cannot be provided by simply compounding a first spark timing adjustment based on humidity at the time of the tip-in with a second spark timing adjustment based on the tip-in air charge parameters. This is because of the synergistic interactions of the humidity based first spark timing adjustment with the tip-in charge parameters based first spark timing adjustment over at least a portion of the tip-in. If the spark retard applied during this portion of the tip-in was merely the sum of the first and second spark timing adjustments, more spark retard than is necessary may be applied, resulting in a drop in fuel economy. Likewise, there may be portions of the tip-in where the first spark timing adjustment that compensates for the humidity effect works against the second spark timing adjustment that compensates for the charge flow effect. If the spark retard applied during this portion of the tip-in was merely the sum of the first and second spark timing adjustments, less spark retard than is necessary may be applied, resulting in tip-in knock. By adjusting an amount of spark retard and a rate of change of the spark retard over the duration of the tip-in based on the humidity, the rate of change of air flow, and the peak air flow during the tip-in, a more accurate spark timing profile that improves tip-in response and reduces knock occurrence can be provided.

In this way, by adjusting an amount of spark timing retard during a tip-in based on each of humidity and transient air charge response, time to torque may be expedited and throttle response on a tip-in may be improved. Further, by increasing the amount of spark timing retard during lower humidity conditions, combustion stability may be improved and possibility of knock may be decreased after a tip-in. By decreasing the amount of spark timing retard during higher humidity conditions, combustion rate may be improved and engine efficiency may be increased. The technical effect of using a three-dimensional map to determine spark timing during tip-in conditions is that in addition to considering the effect of dilution due to humidity, transient changes in air charge parameters may be accounted for while determining an optimal spark timing during a tip-in. In this way, a spark timing may be effectively adjusted during a tip-in to improve overall combustion stability and engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
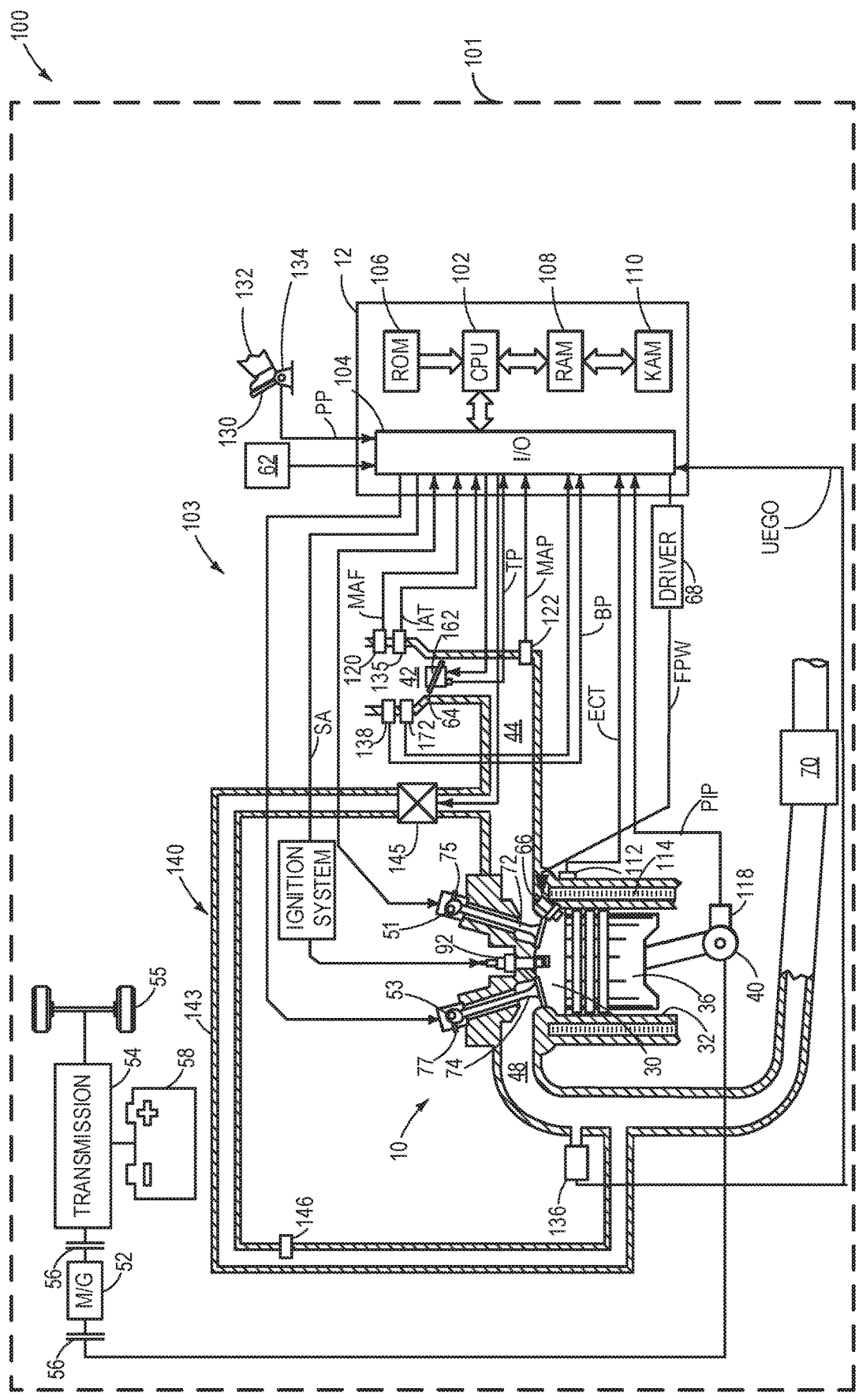
FIG. 1 shows an example engine system in a hybrid vehicle.
Figure 3A:
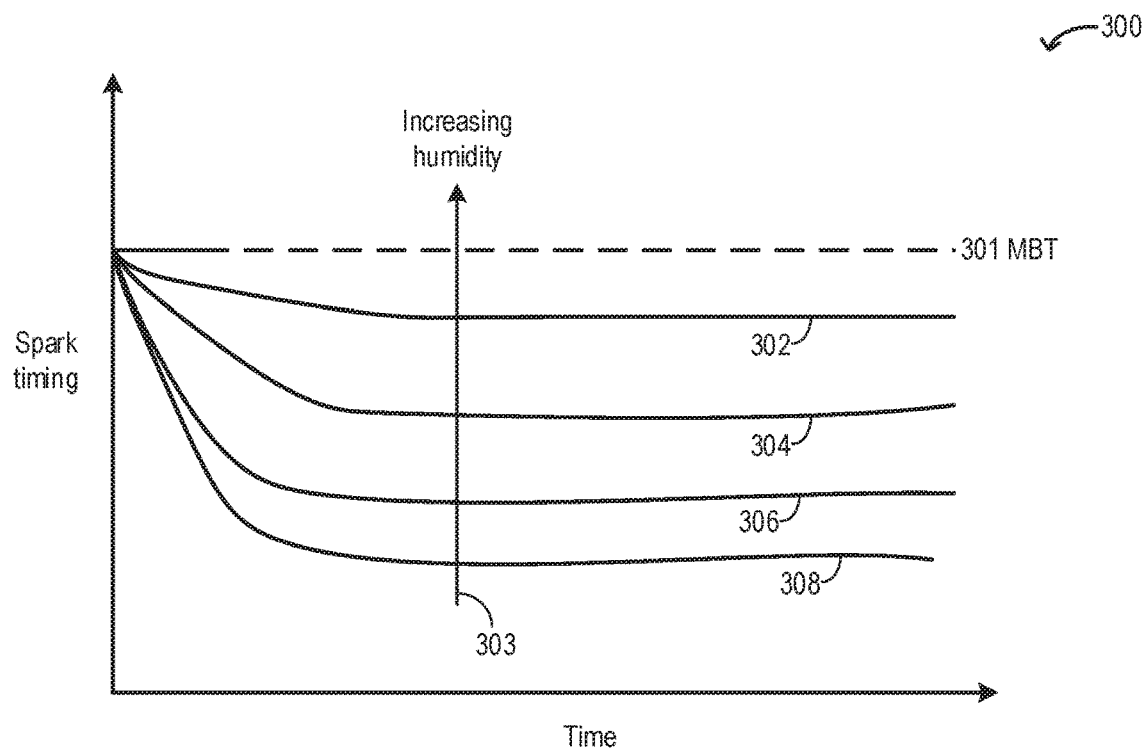
FIG. 3A shows a first example map of spark timing relative to ambient humidity.
Figure 3B:
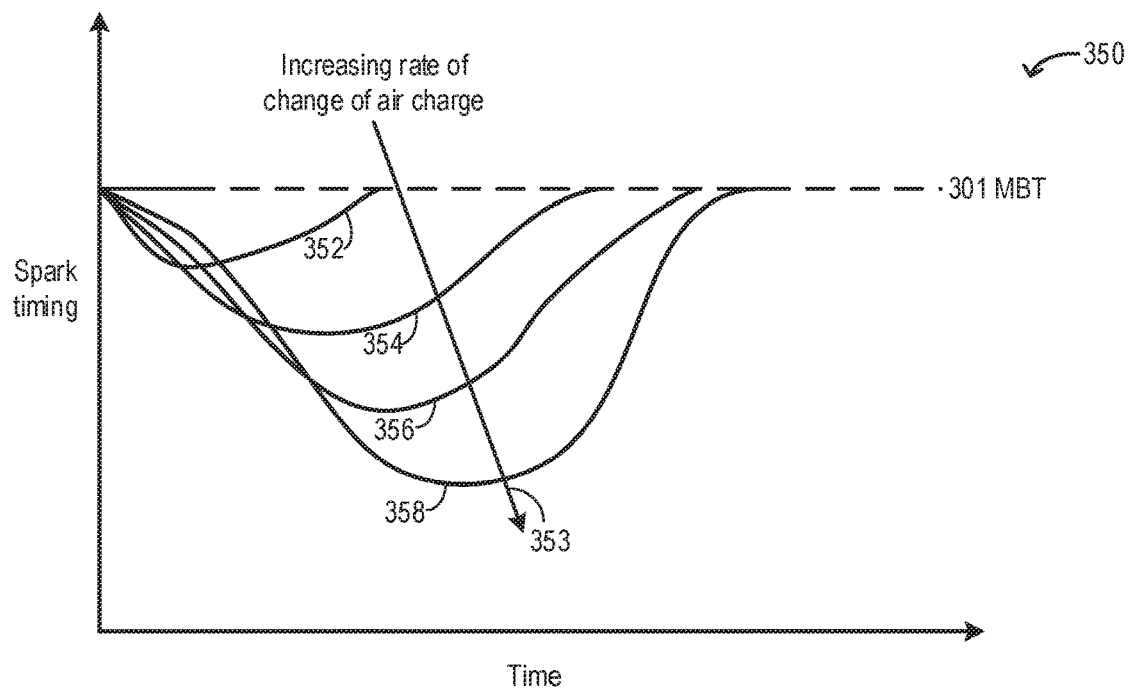
FIG. 3B shows a second example map of spark timing relative to rate of change of air charge.
Figure 3C:
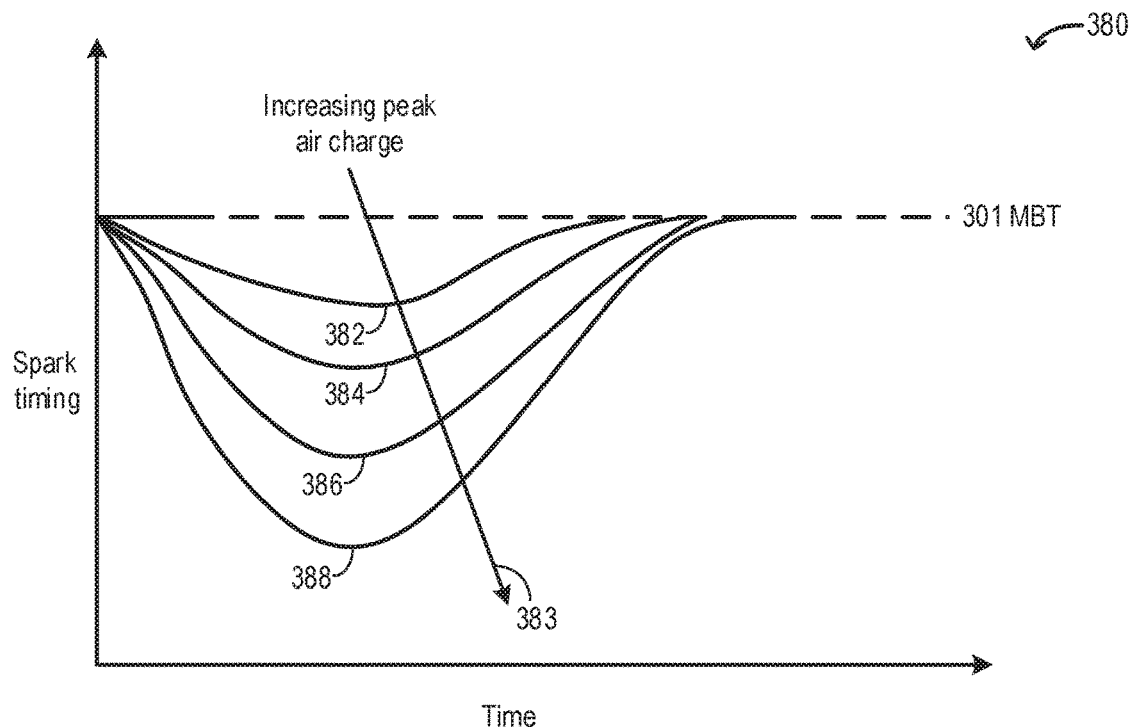
FIG. 3C shows a third example map of spark timing relative to peak air charge.
Figure 3D:
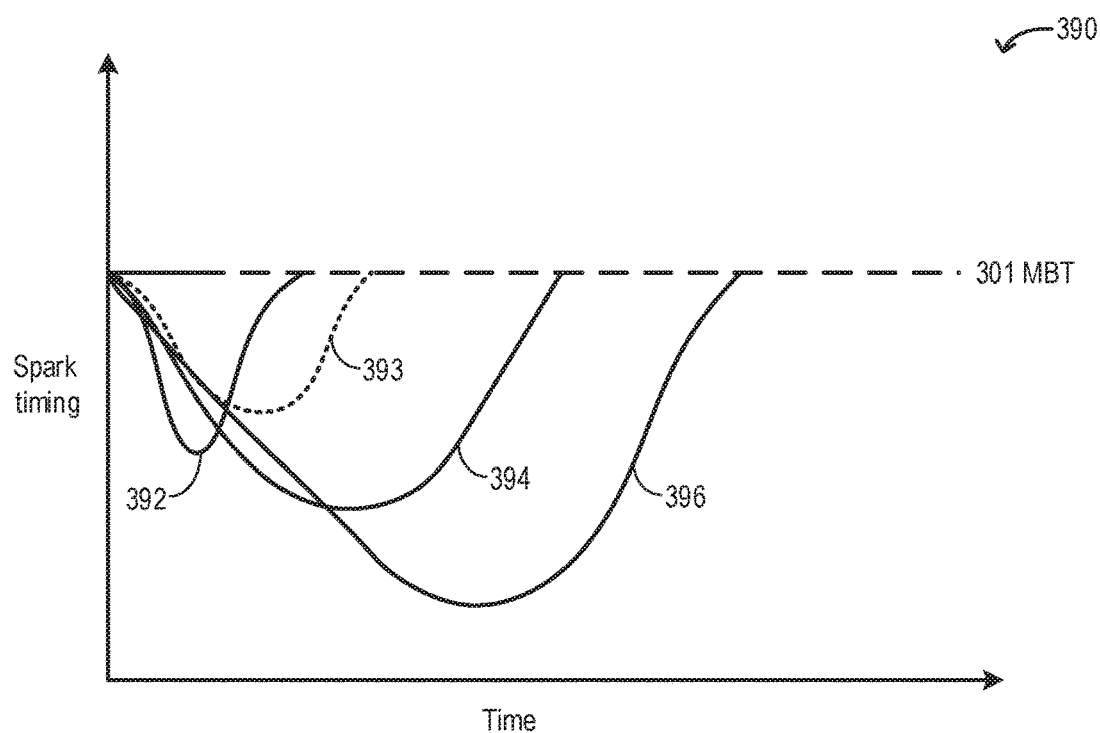
FIG. 3D shows an example map of spark timing adjustments over a plurality of tip-ins.
Figure 4:
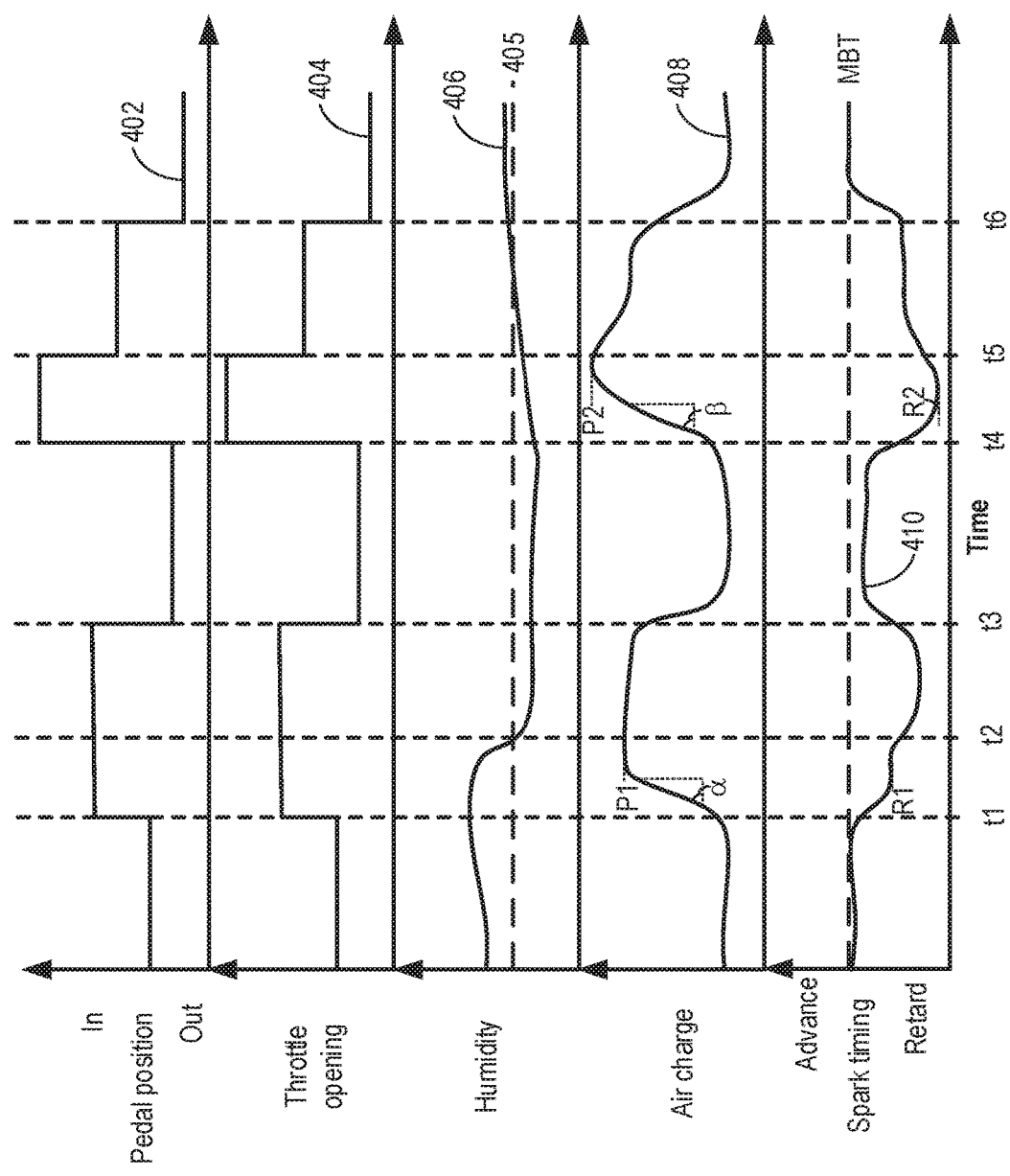
FIG. 4 shows an example adjustment of spark timing during vehicle operation, including during a tip-in and a subsequent tip-out.

The following description relates to systems and methods for adjusting a spark timing during a tip-in event based on ambient humidity and transient tip-in parameters. An example engine system coupled to a hybrid vehicle is shown in FIG. 1. An engine controller may be configured to perform control routines, such as the example routine of FIG. 2, to adjust spark timing during a tip-in condition. Example maps for adjustment of spark timing based on each of humidity, rate of change of air charge, and peak air charge during a plurality of tip-ins, individually is shown in FIGS. 3A-3C. An example map having a spark timing profile adjusted based on each of humidity, rate of change of air charge, and peak air charge while compensating for synergistic and counter-acting effects is shown at FIG. 3D. An example adjustment of spark timing during a tip-in is shown in FIG. 4.

FIG. 1 is a schematic diagram showing a vehicle system 100 comprising a vehicle 101 and an engine system 103. FIG. 1 shows one cylinder of a multi-cylinder engine 10 in the engine system 103. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber (as shown) or in the top of the combustion chamber, for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30. Each cylinder of engine 10 may include a spark plug 92 for initiating combustion. Ignition system may provide an ignition spark to combustion chamber 30 via spark plug 92 in response to spark advance signal SA from controller 12.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 135, the ambient humidity sensor 172, and barometric pressure (BP) sensor 138. The IAT sensor 135 estimates intake air temperature to be used in engine operations and provides a signal to the controller 12. Similarly, the BP sensor 138 estimates the ambient pressure and the ambient humidity sensor estimates ambient humidity for engine operations and provides respective signals to the controller 12. In one example, an intake oxygen sensor may be used to estimate ambient humidity. The intake passage 42 may further include a mass air flow sensor 120 and a manifold air pressure sensor 122 for providing respective signals MAF and MAP to the controller 12. During a tip-in (when the accelerator pedal is engaged), the controller may determine tip-in parameters including rate of change of air charge and peak air charge based on inputs from the mass air flow sensor 120.

Ambient humidity may significantly affect combustion stability and engine performance. During higher humidity conditions, due to an increased amount of water in air charge, the combustion rate may slow down thereby reducing engine efficiency. During lower humidity conditions, there may be an increase in the combustion rate thereby increasing the propensity for knock. During a tip-in condition, a spark timing may be retarded to improve the throttle response and to reduce the time to torque. However, if higher humidity conditions persist during the tip-in, the higher amount of water present in air charge may result in a slower throttle response and an increased time to torque. Therefore, during a tip-in, the spark timing may be adjusted based on each of ambient humidity and transient tip-in air charge parameters including each of an estimated peak air charge and an estimated rate of change of air charge amount. The controller may use a three-dimensional map which is a function of each of the humidity, the estimated peak air charge, and the estimated rate of change of air charge amount to determine each of the respective amounts of spark timing retard, durations of spark timing retard, and rate of change of spark timing retard during a tip-in. Example relations between spark timing and each of the ambient humidity and the transient tip-in parameters is described with reference to the maps of FIGS. 3A-3C. An example map of spark profiles applied during a plurality of tip-in conditions based each of the individual parameters is described with reference to the map of FIG. 3D. An example method to adjust spark timing during a tip-in condition is discussed with reference to the routine of FIG. 2.

In comparison, during a tip-out, spark timing may be adjusted based on ambient humidity, independent of transient tip-out air charge parameters. In one example, during a first tip-out at the higher humidity, spark timing may be advanced from MBT and during a second tip-out at a lower humidity, spark timing may be maintained at MBT.

An exhaust gas sensor 136 is shown coupled to the exhaust passage 48 upstream of an emission control device 70. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 136. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust AFR from oxygen sensor 136, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122, and ambient humidity from sensor 172. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a tip-in, as estimated via a pedal position sensor 134, the controller may estimate a rate of change of air charge and peak air charge based on inputs from the mass air flow sensor 120. The controller may then send a signal to the spark plug 92 to retard spark timing based on each of the rate of change of air charge and the peak air charge and further based on an ambient humidity as estimated via the humidity sensor 172.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation. In one example, battery 58 may supply power to a hydraulic system and/or an electric motor for operation of the lifting mechanism. In another example, a separate on-board battery (different from traction battery 58), charged using engine power may supply power to a hydraulic system and/or an electric motor for operation of the lifting mechanism.

In this way, the system of FIG. 1 enables a system for a vehicle comprising: a vehicle, an accelerator pedal, an engine with a cylinder, an intake system including each of a throttle, a humidity sensor, an air mass flow sensor, and a manifold air pressure sensor, an exhaust system including an oxygen sensor, a spark plug coupled to the cylinder, and a controller with computer readable instructions stored on non-transitory memory for: in response to a tip-in of the accelerator pedal, estimating each of an ambient humidity, a peak air charge of the tip-in, and a rate of change of air charge of the tip-in, and retarding a spark timing relative to MBT based on each of the estimated ambient humidity, the peak air charge, and the rate of change of air charge.

Figure 2:
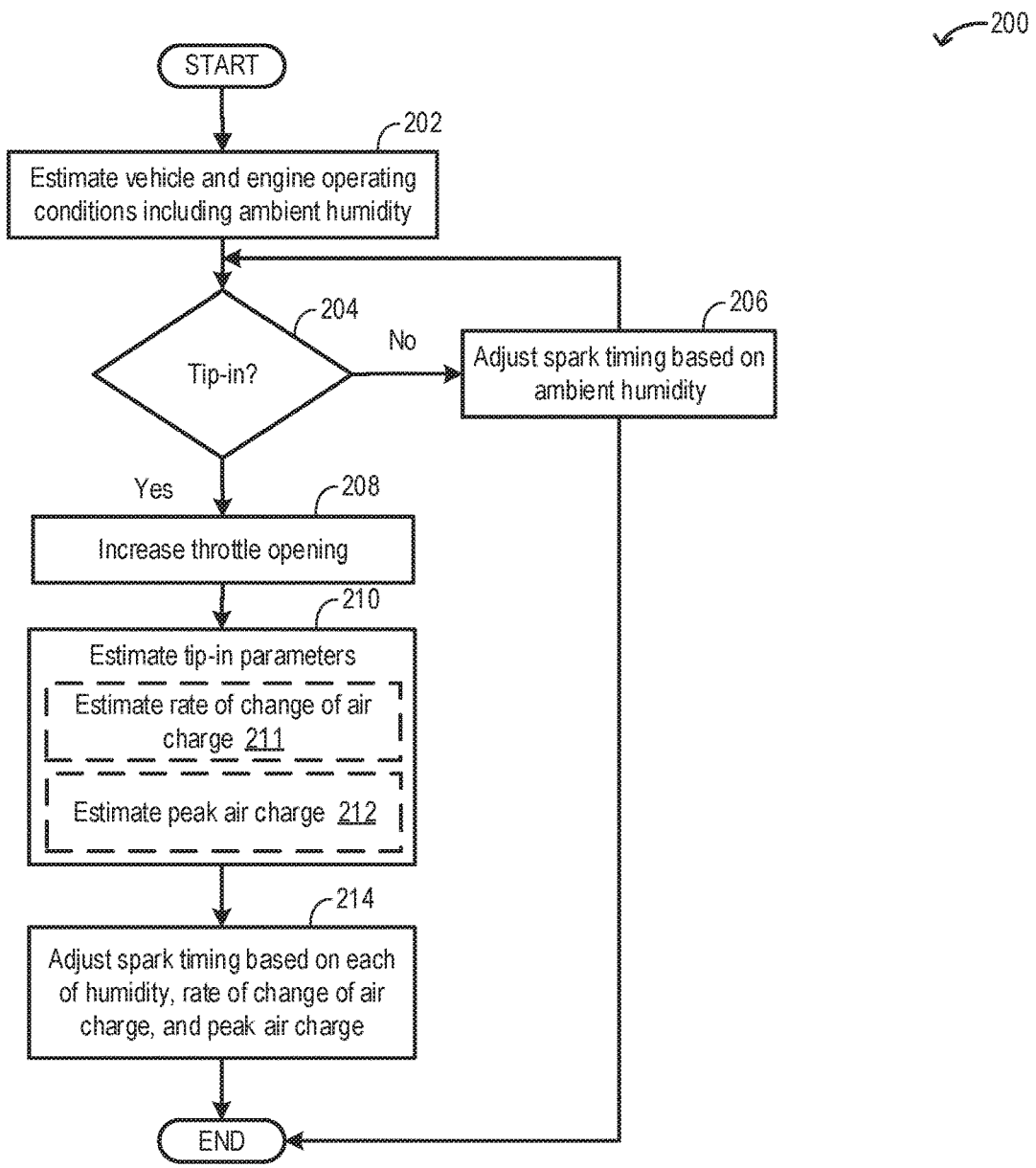
FIG. 2 shows a flow chart illustrating an example method that can be implemented to adjust spark timing during a tip-in condition.

FIG. 2 shows an example method 200 for adjusting spark timing during steady-state and transient engine operating conditions, including during a tip-in condition and a tip-out condition. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, current vehicle and engine operating conditions may be estimated and/or measured. These may include, for example, operator torque demand, engine speed, vehicle speed, engine temperature, engine load, exhaust temperature, manifold pressure, manifold air flow, battery state of charge, etc. The controller may also determine ambient conditions such as ambient humidity based on inputs from an engine intake system humidity sensor (such as humidity sensor 172 in FIG. 1), ambient temperature, and barometric pressure. Ambient humidity may also be estimated based on input from an intake and/or an exhaust oxygen sensor.

At 204, the routine includes determining if there is a sudden increase in torque demand due to a tip-in event. The sudden increase in torque demand may be responsive to an operator engaging the accelerator pedal. A tip-in condition may be confirmed based on input from a pedal position sensor (such as pedal position sensor 134 in FIG. 1). As such, the tip-in condition is a transient engine operating condition with an increase in torque demand.

If it is determined that a tip-in has not occurred, such as when the engine is operating at steady-state condition or when there is a tip-out due to the operator releasing the accelerator pedal, the method moves to 206 where spark timing may be adjusted based only on ambient humidity. Water present in air charge may dilute the air-fuel mixture in the cylinder, thereby reducing the rate of combustion and adversely affecting engine efficiency. During higher humidity conditions, in order to accelerate the rate of combustion, spark timing may be advanced (e.g., from a retarded position towards MBT) or maintained at maximum brake torque (MBT). The controller may determine an amount of spark advance to apply based on the ambient humidity. For example, the controller may determine a control signal to send to a spark discharge circuit through a determination that directly takes into account a determined ambient humidity, such as increasing the amount of spark advance with increasing humidity. The controller may alternatively determine the amount of spark advance based on a calculation using a look-up table with the input being ambient humidity and the output being the amount of spark advance.

However, during lower humidity conditions, the water content of the air-fuel mixture may be lower causing an increase in the rate of combustion, thereby affecting combustion stability and increasing the propensity for knock. Therefore, in order to reduce the rate of combustion, spark timing may be retarded relative to MBT. The controller may determine an amount of spark timing retard based on the ambient humidity. For example, the controller may determine a control signal to send to the spark discharge circuit through a determination that directly takes into account a determined ambient humidity, such as increasing the amount of spark timing retard with decreasing humidity. The controller may alternatively determine the amount of spark timing retard based on a calculation using a look-up table with the input being ambient humidity and the output being the amount of spark timing retard. In this way, by adjusting spark timing based on ambient humidity, engine efficiency may be improved and occurrence of knock may be reduced.

If at 204 it is determined that a tip-in has occurred, at 208, the throttle opening may be proportionally increased to increase the amount of air charge. The controller may determine a control signal to send to the throttle plate through a determination that directly takes into account a determined pedal position, such as increasing the throttle opening with increasing application of the accelerator pedal. The controller may alternatively determine the throttle opening based on a calculation using a look-up table with the input being accelerator pedal position and the output being the amount of throttle opening.

During a tip-in, transient tip-in parameters such as a rate of change (e.g., increase) of air charge and a peak air charge may vary. At 210, the routine includes estimating the tip-in parameters during the tip-in condition. Estimating the transient tip-in charge parameters includes, at 211, estimating or measuring the rate of change of air charge based on inputs from one or more intake system sensors such as a mass air flow sensor (such as mass air flow sensor 120 in FIG. 1) or a manifold air pressure sensor (such as mass air pressure sensor 122 in FIG. 1). At 212, the controller may further measure or estimate the peak air charge (the highest magnitude of air charge) based on inputs such as the mass air flow sensor and/or the manifold air pressure sensor. In alternate examples, the tip-in air charge parameters may be inferred based on engine operating conditions. For example, the controller may infer the rate of change of air charge and the peak air charge based on a calculation using a look-up table or algorithm with the input being accelerator pedal position and barometric pressure and the outputs being the rate of change of air charge and the peak air charge.

At 214, the method includes adjusting spark timing based on each of the estimated rate of change of air charge, the estimated peak air charge, and the ambient humidity. In one example, a three-dimensional map may be used to determine the spark timing during the transient tip-in condition. The three-dimensional map may be stored in the controller's memory and plotted as a function of each of ambient humidity, the rate of change of air charge, and the peak air charge. The map may be used to determine target changes in the amount of spark timing retard based on humidity and the tip-in parameters. In one example, during a tip-in, the controller may refer a first look-up table to determine a first amount of spark timing retard from MBT as a first function of the rate of change of the air charge during the tip-in, a second look-up table to determine a second amount of spark timing retard from MBT as a second function of the peak air charge, and a third look-up table to determine a third amount of spark timing retard from MBT as a third function of ambient humidity. The first function may include a first amount of spark timing retard, a first duration of spark timing retard, and a first rate of change of spark timing retard based on the rate of change of the air charge. The second function may include a second amount of spark timing retard from MBT, a second duration of spark timing retard and second rate of change of spark timing retard based on the peak air charge. The third function may include a third amount of spark timing retard from MBT, a third duration of spark timing retard and third rate of change of spark timing retard based on the ambient humidity. Example relations between spark timing and each of the individual parameters is described with reference to the maps of FIGS. 3A-3C below. The controller may then use a model or algorithm to interpolate the first, second, and third amounts to generate a final spark retard profile for the tip-in event that accounts for synergistic effects and counteracting effects of each spark timing adjustment. The final spark retard profile may include a final amount of spark timing retard, a final duration of spark timing retard, and a final rate of change of spark timing and the final spark timing retard profile may be different from each of a first spark retard profile as obtained based on the first function, a second spark retard profile as obtained based on the second function, and a third spark retard profile as obtained based on the third function. An example interpolation between spark timing adjustments for each of the individual parameters is described with reference to the map of FIG. 3D below. In the interpolation, the weightage of the first, second, and third amounts may be varied based on the operating conditions. For example, at a given humidity setting, the tip-in spark retard profile may have the contribution of the first amount of spark retard decreased and the contribution of the second and third amounts increased over a first segment of the tip-in, and have the contribution of the first amount of spark retard increased and the contribution of the second and third amounts decreased over a second, later segment of the tip-in.

As such, the optimum value of the tip-in spark retard may depend on flame front propagation speed and its race with the auto-ignition chemical kinetics that produce knock. Since these two factors vary in a nonlinear fashion with the factors indicated by FIGS. 3A-3C, the final amount of spark timing retard during a tip-in may not be a linear combination of spark timing retard due to humidity, spark timing retard due to peak air charge, and spark timing retard due to rate of change in air charge. In addition, other parameters (measured or modeled value) such as air charge temperature, engine coolant temperature, residual composition, and variable cam timing position may influence the final amount of spark timing retard.

In another example, the first, second, and third functions may be interpolated to generate the three-dimensional map, wherein the function generated by the three-dimensional map is distinct from a sum of the first, second, and third functions. The controller may determine the final spark timing based on a calculation using the three-dimensional map with the input being each of the ambient humidity, rate of change of air charge over the tip-in, and peak air charge on the tip-in and the output being a spark discharge signal (e.g., discharge current). During the tip-in, the spark timing retard may be higher at lower humidity levels, and the spark timing retard may be lower at higher humidity levels. By increasing the amount of spark timing retard during lower humidity conditions, combustion stability may be improved and possibility of knock may be decreased. By decreasing the amount of spark timing retard during higher humidity conditions, combustion rate may be increased and engine efficiency may be improved.

FIG. 3A shows a first example two dimensional map 300 of spark timing relative to ambient humidity. The x-axis of the map denotes time and the y-axis denotes spark timing. The dotted line 301 denotes the maximum brake torque (MBT). MBT timing may be determined based on the engine operating conditions as estimated in step 202 of method 200.

The lines 302-308 shows spark timing (relative to time) at progressively decreasing ambient humidity. An amount of spark timing retard may be inversely proportional to ambient humidity. As shown by arrow 303, with a decrease in ambient humidity, the amount of spark timing retard from MBT applied at a tip-in increases (going from plot 302 to 308). In addition, at a given ambient humidity condition, the spark timing retard increases at a first higher rate and then subsequently plateaus.

FIG. 3B shows a second example two dimensional map 350 of spark timing relative to a transient rate of change of air charge during a tip-in. The x-axis of the map denotes time and the y-axis denotes spark timing. The dotted line 301 denotes the maximum brake torque (MBT).

The lines 352-358 shows spark timing (relative to time) at progressively increasing rate of change of air charge. Each of an amount of spark timing retard and a duration of spark timing retard may be directly proportional to the rate of change of air charge. As shown by arrow 353, with an increase in the rate of change of air charge, each of the amount of spark timing retard from MBT and the duration of spark timing retard increases (going from plot 352 to 358). At a given rate of change of air charge, the amount of spark timing retard first increases to a highest amount of spark timing retard (corresponding to the given rate of change of air charge), then the amount of spark timing retard decrease, and at the end of the transient tip-in, the spark timing may be resumed at MBT. Immediately after initiation of spark timing retard, a rate of change of spark timing retard may be inversely proportional to the rate of change of air charge. With an increase in the rate of change of air charge, the rate of change of spark timing retard may decrease (going from plot 352 to 358). However, towards the end of the duration of spark timing retard (as the spark timing is advanced towards MBT), a rate of change of spark timing retard may be directly proportional to the rate of change of air charge. With an increase in the rate of change of air charge, the rate of change of spark timing retard may increase (going from plot 352 to 358).

FIG. 3C shows a third example two dimensional map 380 of spark timing relative to peak air charge. The x-axis of the map denotes time and the y-axis denotes spark timing. The dotted line 301 denotes the maximum brake torque (MBT).

The lines 382-388 shows spark timing (relative to time) at progressively increasing peak air charge. Each of an amount of spark timing retard and a duration of spark timing retard may be directly proportional to the peak air charge. As shown by arrow 383, with an increase in the peak air charge, each of the amount of spark timing retard from MBT and the duration of spark timing retard increases (going from plot 382 to 388). At a given peak air charge, the amount of spark timing retard first increases to a highest amount of spark timing retard (corresponding to the given rate of change of air charge), then the amount of spark timing retard decrease, and at the end of the transient tip-in, the spark timing may be resumed at MBT. Immediately after initiation of spark timing retard, a rate of change of spark timing retard may be directly proportional to the peak air charge. With an increase in the peak air charge, the rate of change of spark timing retard may increase (going from plot 382 to 388). Also, towards the end of the duration of spark timing retard (as the spark timing is advanced towards MBT), a rate of change of spark timing retard may be directly proportional to the peak air charge. With an increase in the peak air charge, the rate of change of spark timing retard may increase (going from plot 352 to 358).

FIG. 3D shows a fourth example map 390 of spark timing during each of a first, a second, and a third tip-in. The x-axis of the map denotes time and the y-axis denotes spark timing. The dotted line 301 denotes the maximum brake torque (MBT). The spark profile may be adjusted during each of the three tip-ins based on each of the rate of change of air charge, peak air charge, and humidity. The spark profile (such as amount of spark retard and a duration of spark retard) for each of the first, the second, and the third tip-in may be obtained by interpolating a first amount of spark timing retard from MBT determined as a function of the rate of change of the air charge during the tip-in, a second amount of spark timing retard from MBT determined as a function of the peak air charge during the tip-in, and a third amount of spark timing retard from MBT determined as a function of ambient humidity during the tip-in. The spark profiles for each of the first, the second, and the third tip-in as shown in map 390 may not be obtained by juxtaposing the first amount of spark timing retard from MBT, the second amount of spark timing retard from MBT, and the third amount of spark timing retard from MBT. By determining the spark profile during a tip-in based on interpolation of spark timing adjustments based on each of the tip-in air charge parameters and ambient humidity, synergistic interactions of the tip-in air charge parameters based spark timing adjustments with the humidity based spark timing adjustments may be accounted for.

The first solid line 392 shows a first spark timing during a first tip-in, the second solid line 394 shows a second spark timing during a second tip-in, and the third solid line 396 shows a third spark timing during a third tip-in. As such, the first tip-in, the second tip-in, and the third tip-in may be different from one another. The first tip-in may be responsive to a different driver pedal tip-in than each of the second tip-in and the third tip-in. The first tip-in may correspond to a first set of conditions including a first humidity, a first rate of change of air charge, and a first peak air charge. Similarly, the second tip-in may correspond to a second set of conditions including a second humidity, a second rate of change of air charge, and a second peak air charge while the third tip-in may correspond to a third set of conditions including a third humidity, a third rate of change of air charge, and a third peak air charge. It is observed that for each tip-in based on the respective set of conditions, each of an amount of spark timing retard, a duration of spark timing retard, and a rate of change of spark timing retard may be different. For example, during a tip-in at a dry condition spark timing may be retarded more conservatively than during humid conditions, since the burn rate is faster at dry conditions and hence the likelihood of knock increases.

During each tip-in, the controller may determine the transient spark timing using each of the first example map 300 correlating spark timing with humidity, the second example map 350 correlating spark timing with the rate of change of air charge, and the third example map 380 correlating spark timing with the peak air charge. During the first tip-in, the controller may use the first set of conditions (first humidity, the first rate of change of air charge, and the first peak air charge) as input to the three-dimension map to obtain the transient spark timing as the output. The transient spark timing at the first tip-in may not be a resultant of mathematically combining the amounts of spark timing retard and the durations of spark timing retard as obtained from each of the first map 300, the second map 350, and the third map 380.

As such, the conditions including humidity, rate of change of air charge, and peak air charge may be interrelated and may not independently influence the spark timing. Individual spark timing adjustments based on each of the humidity, the rate of change of air charge, and the peak air charge may influence each other. Therefore, if the transient spark timing at a tip-in is determined by combining individual influences of each of humidity, rate of change of air charge, and peak air charge, the resultant spark timing may not be optimal. Dotted line 393 shows a transient spark timing obtained by mathematically combining the effects of each of the first humidity, the first rate of change of air charge, and the first peak air charge on spark timing. There are significant differences between the spark timing 393 obtained by mathematically combining the effects of humidity and tip-in parameters and first spark timing 392 obtained based on the same set of conditions using the three-dimensional map. The amount of spark timing retard for the first spark timing 392 is higher than that of the spark timing 393, the duration of spark timing retard for the first spark timing 392 is shorter than that of the spark timing 393, and the rate of change of spark timing retard for the first spark timing 392 is higher than that of the spark timing 393. As an example, if the for the first tip-in, a higher amount of spark timing retard would have been erroneously used for a longer duration, the fuel efficiency would have reduced and engine performance would have been adversely affected. By using an optimal spark timing retard during a tip-in, combustion stability and torque response of the engine may be improved.

In this way, during a first tip-in at a higher humidity, spark timing may be temporarily retarded from current timing before the tip-in for a first, shorter duration and to a first, lesser amount; and during a second tip-in at a lower humidity, spark timing may be temporarily retarding from current timing before the tip-in for a second, longer duration and to a second, greater amount, wherein each of the first duration, the second duration, the first amount, and the second amount are based on transient tip-in air charge parameters. By adjusting an amount of spark timing retard during a tip-in based on each of humidity and transient air charge response, time to torque may be expedited and throttle response may be improved.

As such, adjustments to spark timing retard during transient conditions such as tip-in may be limited by a borderline spark profile. In other words, spark may not be retarded beyond the borderline spark, reducing the possibility of knock. The borderline spark profile may include a borderline amount of (maximum permissible amount) of spark timing retard from MBT, a borderline duration of spark timing retard, and a borderline rate of change of spark timing (from a current timing to the borderline spark timing). In one example, during a tip-in, the controller may estimate the rate of change of air charge based on input from the intake air flow sensor and compare the estimated rate of air charge to a retrieved most recent rate of change of air charge experienced during an immediately previous tip-in when the borderline spark profile was last updated. If there is a higher than threshold difference between the estimated rate of change of air charge and the retrieved rate of change of air charge, the controller may update the borderline spark profile. A state machine may update the borderline spark profile based on the engine operating parameters including engine load and engine speed. The state machine may determine the final spark profile (such as using the three-dimensional map) based on the updated borderline spark profile and a calibration adder. In one example, the calibration adder may be a function of ambient humidity.

In one example, adjustments to spark profile may be initiated upon confirmation of a tip-in condition. The tip-in condition may be confirmed based on a higher than threshold change in the rate of change of air charge. During the tip-in, as the rate of change of air charge changes, the air charge may reach a peak air charge. The controller may infer that the peak air charge has been reached when a change in air charge between consecutive cylinder events falls below a threshold. At that time, it may be inferred that the air charge reaching each engine cylinder has plateaued and there may be no further significant change in the rate of change of air charge and the peak air charge. Based on the inference that the air charge between each engine cylinder has plateaued, the spark timing adjustment applied during the transient tip-in condition may no longer be continued and spark timing retard may be ramped down (e.g., ramped back towards MBT) to an updated spark timing over a number of subsequent engine cycles. The controller may determine the updated spark timing based on current engine operating conditions and ambient humidity. In one example, the updated spark timing may be the spark timing used prior to the tip-in condition. In another example, if the rate of change of the air charge or the peak air charge were different, the updated spark timing may be different from the spark timing used prior to the tip-in condition.

FIG. 4 shows an example operating sequence 400 illustrating adjusting spark timing during a tip-in based on humidity and tip-in air charge parameters. The horizontal (x-axis) denotes time and the vertical markers t1-t6 identify significant times in each of the pre-delivery and post-delivery phase of the vehicle.

The first plot, line 402, shows a position of an accelerator pedal. The second plot, line 404, shows an opening of the intake throttle as estimated via a throttle position sensor. The third plot, line 406, shows a variation in ambient humidity as estimated via an intake humidity sensor. Dotted line 405 denotes a threshold humidity. The fourth plot, line 408, shows variation in air charge as estimated via engine intake system sensors including a mass air flow sensor and a manifold air pressure sensor. The fifth plot, line 410, shows spark timing relative to maximum brake torque (MBT).

Prior to time t1, based on the pedal position, a lower torque demand is inferred and based on the lower torque demand, the throttle opening is smaller to allow a smaller amount of air charge to enter the intake manifold and the engine cylinders. During this time the humidity is above the threshold 405 and based on the higher than threshold humidity, the spark timing is maintained at MBT. At time t1, in response to a first tip-in to wide open throttle (WOT) (accelerator pedal fully engaged by operator), the throttle opening is increased. Due to the increase in the throttle opening, there is a corresponding change in transient tip-in air charge parameters. The tip-in air charge parameters include each of a peak air charge and a rate of change of air charge. The highest amount of air charge obtained in response to the first tip-in is the peak air charge as denoted by P1 (first peak air charge). The rate at which the peak air charge is attained is the rate of change of air charge, as denoted by slope a (first rate of change of air charge). Increase in air charge allows the engine to deliver the requested torque. Due to the increase in each of the peak air charge and the rate of change of air charge, in order to improve the combustion rate and increase the time to torque, spark timing is retarded to R1 relative to MBT. Between time t1 and t2, the amount of spark timing retard R1 is determined based on each of the humidity, the first rate of change of air charge a, and the first peak air charge P1. A three-dimensional map is used to determine the spark timing in response to the first tip-in.

At time t2, the vehicle has moved to a drier region where the ambient humidity is lower. In particular, the ambient humidity decreases to below the threshold 405, and due to the drier air charge, there is a possibility of increase in the combustion rate, thereby increasing the propensity for knock. Therefore, between time t2 and t3, even as the tip-in air charge parameters are maintained, in order to reduce the combustion rate, the amount of spark timing retard is increased as a function of current ambient humidity and the tip-in air charge parameters.

At time t3, in response to the accelerator pedal being released by operator, the opening of the throttle is correspondingly decreased. Due to the decrease in torque demand and throttle opening, the air charge amount decreases. Based on the decreased air charge amount while there is no appreciable change in humidity (due to the vehicle continuing to operate in the drier region), the spark timing retard is decreased. Between time t3 and t4, the spark timing is adjusted solely based on the humidity level. Due to the lower than threshold humidity level, in order to maintain an optimal combustion rate, the spark timing is maintained retarded from MBT.

At time t4, in response to a second tip-in, the throttle opening is correspondingly increased. The second tip-in is larger than first tip-in. The transient tip-in air charge parameters including each of a peak air charge and a rate of change of air charge are measured. The peak air charge during the second tip-in (second peak air charge) is denoted by P2 and the rate of change of air charge (second rate of change of air charge amount) as denoted by slope 13. The second peak air charge P2 is higher than the first peak air charge P1. Between time t4 and t5, the amount of spark timing retard is determined based each of the humidity, the second rate of change of air charge, and the second peak air charge P2 using the three-dimensional map. Due to the lower than threshold humidity and the higher peak air charge P2, the amount of spark timing retard R2, between time t4 and t5, is higher than that of the spark timing retard between time t2 and t3.

At time t5, in response to the accelerator pedal being partially released, there is a tip-out and the throttle opening is correspondingly decreased. The tip-out at time t5 is smaller compared to the tip-out at time t3. Even though there is no appreciable change in humidity, based on the reduction in the transient air charge amount between time t5 and t6, the spark timing retard is reduced as a function of transient air charge parameters including peak air charge and rate of change of air charge. At time t6, in response to the accelerator pedal being completely disengaged, the opening of the throttle is correspondingly decreased. Also, at time t6 the humidity increases to above the threshold 405 due to the vehicle moving to a humid location. Based on the decreased air charge amount and the increase in humidity, the spark timing is advanced towards MBT as a function of ambient humidity independent of the air charge parameters. After time t6, spark timing may be maintained at MBT as there is no appreciable change in ambient humidity and transient air charge parameters. In this way, during a tip-in, spark timing may be adjusted based on each of humidity and transient tip-in air charge parameters while during a tip-out, spark timing may be adjusted solely based on humidity.

In this way, by taking into account ambient humidity along with transient changes in air charge during a tip-in, spark timing retard may be better adjusted to provide the desired torque output. The technical effect of determining a spark timing based on each of humidity, rate of change of air charge, and peak air charge using a three-dimensional map is that spark timing may be better estimated resulting in increased combustion stability during a tip-in. By increasing the amount of spark timing retard during lower humidity conditions, combustion stability may be improved and possibility of knock may be decreased after a tip-in and by decreasing the amount of spark timing retard during higher humidity conditions, combustion rate may be improved and engine efficiency may be increased. By obtaining a spark profile by interpolating spark timing adjustments based on each of the ambient humidity, the peak air charge, and the rate of change of air charge, the synergistic effects may be accounted for, so that unnecessary spark retard usage is reduced. This improves fuel economy. By also interpolating and accounting for counteracting effects, too little spark retard usage and resulting knock is averted.

An example engine method comprises: adjusting spark timing applied at an operator tip-in event based on each of ambient humidity and transient air charge parameters of the tip-in event. In any preceding example, additionally or optionally, the transient air charge parameters of the tip-in event include each of a peak air charge and a rate of change of air charge. In any or all of the preceding examples, additionally or optionally, the adjusting includes retarding the spark timing from MBT as each of the peak air charge and the rate of change of air charge increases at a given ambient humidity. In any or all of the preceding examples, additionally or optionally, wherein spark timing is retarded by an amount that is interpolated as a first function of the peak air charge and a second function of the rate of change of air charge. In any or all of the preceding examples, additionally or optionally, wherein the first function includes a first magnitude and first rate of change of spark timing retard from MBT based on the peak air charge, and wherein the second function includes a second magnitude and second rate of change of spark timing retard from MBT based on the rate of change of air charge, the first magnitude and first rate larger/smaller than the second magnitude and second rate. In any or all of the preceding examples, additionally or optionally, wherein the adjusting further includes further retarding spark timing as the ambient humidity, the amount of spark timing retard adjusted as a third function of the ambient humidity. In any or all of the preceding examples, wherein the amount of spark timing retard is additionally or optionally, estimated using a three-dimensional map plotted as a function of the ambient humidity, the peak air charge, and the rate of change of air charge amount. Any or all of the preceding examples further comprising, additionally or optionally, adjusting spark timing at an operator tip-out event following the tip-in event based on the ambient humidity, and independent of the transient air charge parameters of the tip-out event. In any or all of the preceding examples, additionally or optionally, wherein the adjusting spark timing at the tip-out includes advancing spark timing towards MBT at the tip-out event as the ambient humidity increases.

Another engine example method comprises: during a first tip-in at a higher humidity, adjusting temporarily retarding spark timing for a first, shorter duration and to a first, lesser amount; and during a second tip-in at a lower humidity, adjusting temporarily retarding spark timing for a second, longer duration and to a second, greater amount, wherein each of the first duration, the second duration, the first amount, and the second amount are based on transient tip-in air charge parameters. In any preceding example, additionally or optionally, wherein the second tip-in is different from the first tip-in and the second tip-in is responsive to a different driver pedal tip-in than the first tip-in. In any or all of the preceding examples, additionally or optionally, wherein spark timing is adjusted at a first, higher rate of change of spark timing over the first duration and at a second, lower rate of change of spark timing over the second duration. In any or all of the preceding examples, additionally or optionally, wherein the transient tip-in air charge parameters include each of an estimated peak air charge and an estimated rate of change of air charge amount. In any or all of the preceding examples, additionally or optionally, wherein the adjusting spark timing includes retarding spark timing from MBT during each of the first tip-in and the second tip-in using a three-dimensional map. In any or all of the preceding examples, additionally or optionally, wherein the three-dimensional map is a function of each of the humidity, the estimated peak air charge, and the estimated rate of change of air charge amount. In any or all of the preceding examples, additionally or optionally, wherein each of the first duration and the first amount of spark adjustments are increased as one or more of the estimated peak air charge and the estimated rate of change of air charge amount increases and wherein each of the second duration and the second amount of spark adjustments are increased as one or more of the estimated peak air charge and the estimated rate of change of air charge amount increases. Any or all of the preceding examples further comprising, additionally or optionally, during a first tip-out at the higher humidity, advancing spark timing from MBT independent of transient tip-out air charge parameters and during a second tip-out at a lower humidity, maintaining spark timing at MBT.

In yet another example, a vehicle system comprises: a vehicle, an accelerator pedal, an engine with a cylinder, an intake system including each of a throttle, a humidity sensor, an air mass flow sensor, and a manifold air pressure sensor, an exhaust system including an oxygen sensor, a spark plug coupled to the cylinder, and a controller with computer readable instructions stored on non-transitory memory for: in response to a tip-in of the accelerator pedal, estimating each of an ambient humidity, a peak air charge of the tip-in, and a rate of change of air charge of the tip-in; and retarding a spark timing relative to MBT based on each of the estimated ambient humidity, the peak air charge, and the rate of change of air charge. In any preceding example, additionally or optionally, wherein the retarding includes retarding spark timing further from MBT when the ambient humidity is higher relative to when the ambient humidity is lower. In any or all of the preceding examples, additionally or optionally, wherein the retarding further includes increasing an amount of spark timing retard with an increase in one or more of the peak air charge and the rate of change of air charge amount. In any or all of the preceding examples, additionally or optionally, wherein the controller includes further instructions for: in response to a tip-out of the accelerator pedal, advancing the spark timing towards MBT, an amount of spark advance based on the estimated ambient humidity and independent of each of a peak air charge and a rate of change of air charge of the tip-out.

In a further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting spark timing applied at an operator tip-in event based on each of ambient humidity and transient air charge parameters of the tip-in event, the adjusting including retarding the spark timing from MBT as each of a peak air charge and a rate of change of air charge increases at a given ambient humidity.

2. The method of claim 1, wherein the transient air charge parameters of the tip-in event include each of the peak air charge and the rate of change of air charge.

3. The method of claim 1, wherein spark timing is retarded by an amount that is interpolated as a first function of the peak air charge and a second function of the rate of change of air charge.

4. The method of claim 3, wherein the first function includes a first magnitude and a first rate of change of spark timing retard from MBT based on the peak air charge, and wherein the second function includes a second magnitude and a second rate of change of spark timing retard from MBT based on the rate of change of air charge, the first magnitude and the first rate larger/smaller than the second magnitude and the second rate.

5. The method of claim 3, wherein the adjusting includes further retarding spark timing as a third function of the ambient humidity.

6. The method of claim 2, wherein an amount of spark timing retard is estimated using a three-dimensional map plotted as a function of the ambient humidity, the peak air charge, and the rate of change of air charge.

7. The method of claim 1, further comprising adjusting spark timing at an operator tip-out event following the tip-in event based on the ambient humidity, and independent of the transient air charge parameters of the tip-out event.

8. The method of claim 7, wherein the adjusting spark timing at the tip-out event includes advancing spark timing towards MBT at the tip-out event as the ambient humidity increases.

9. An engine method, comprising:
during a first tip-in at a higher humidity, temporarily retarding spark timing for a first, shorter duration and to a first, lesser amount; and
during a second tip-in at a lower humidity, temporarily retarding spark timing for a second, longer duration and to a second, greater amount,
wherein each of the first duration, the second duration, the first amount, and the second amount is based on transient tip-in air charge parameters, wherein spark timing is adjusted at a first, higher rate of change of spark timing over the first duration and at a second, lower rate of change of spark timing over the second duration.

10. The method of claim 9, wherein the second tip-in is different from the first tip in.

11. The method of claim 9, wherein the transient tip-in air charge parameters include each of an estimated peak air charge and an estimated rate of change of air charge amount.

12. The method of claim 11, wherein the adjusting spark timing includes retarding spark timing from MBT during each of the first tip-in and the second tip-in using a three-dimensional map.

13. The method of claim 12, wherein the three-dimensional map is a function of each of the humidity, the estimated peak air charge, and the estimated rate of change of air charge amount.

14. The method of claim 11, wherein each of the first duration and the first amount of spark adjustments are increased as one or more of the estimated peak air charge and the estimated rate of change of air charge amount increases and wherein each of the second duration and the second amount of spark adjustments are increased as one or more of the estimated peak air charge and the estimated rate of change of air charge amount increases.

15. A vehicle system comprising:
a vehicle;
an accelerator pedal;
an engine with a cylinder;
an intake system including each of a throttle, a humidity sensor, an air mass flow sensor, and a manifold air pressure sensor;
an exhaust system including an oxygen sensor;
a spark plug coupled to the cylinder; and
a controller with computer readable instructions stored on non-transitory memory for:
  in response to a tip-in of the accelerator pedal,
    estimating each of an ambient humidity, a peak air charge of the tip-in, and a rate of change of air charge of the tip-in; and
    retarding a spark timing relative to MBT based on each of the estimated ambient humidity, the peak air charge, and the rate of change of air charge, wherein the retarding includes retarding spark timing further from MBT when the ambient humidity is higher relative to when the ambient humidity is lower.

16. The system of claim 15, wherein the retarding further includes increasing an amount of spark timing retard with an increase in one or more of the peak air charge and the rate of change of air charge amount.

17. The system of claim 15, wherein the controller includes further instructions for: in response to a tip-out of the accelerator pedal, advancing the spark timing towards MBT, an amount of spark advance based on the estimated ambient humidity and independent of each of a peak air charge and a rate of change of air charge amount of the tip-out.

* * * * *